US012750147B2

(12) United States Patent
Abe

(10) Patent No.: US 12,750,147 B2
(45) Date of Patent: Sep. 29, 2026

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Mitsumasa Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 18/511,819

(22) Filed: Nov. 16, 2023

(65) Prior Publication Data

US 2024/0171295 A1 May 23, 2024

(30) Foreign Application Priority Data

Nov. 22, 2022 (JP) ................................ 2022-186215

(51) Int. Cl.
*H04J 3/06* (2006.01)
*H04L 7/04* (2006.01)
*H04N 23/661* (2023.01)

(52) U.S. Cl.
CPC .............. *H04J 3/0667* (2013.01); *H04L 7/04* (2013.01); *H04N 23/661* (2023.01)

(58) Field of Classification Search
CPC ....... H04J 3/0667; H04L 7/04; H04N 23/661; H04N 23/60; H04N 23/90
See application file for complete search history.

(56) References Cited

U.S. PATENT DOCUMENTS

| | | | | |
|---|---|---|---|---|
| 10,284,692 | B2 * | 5/2019 | Ichimura | G06F 1/14 |
| 2017/0070990 | A1 * | 3/2017 | Otsu | H04W 72/0446 |
| 2022/0070801 | A1 * | 3/2022 | Satoh | G01D 21/02 |
| 2022/0131681 | A1 * | 4/2022 | Maruyama | H04J 3/0667 |
| 2022/0416927 | A1 * | 12/2022 | Tsuboi | H04L 7/0012 |

FOREIGN PATENT DOCUMENTS

JP 2018191226 A 11/2018

* cited by examiner

*Primary Examiner* — Dady Chery
(74) *Attorney, Agent, or Firm* — Canon U.S.A., Inc. IP Division

(57) ABSTRACT

A communication apparatus including a first clock and a second clock which operate according to a predetermined time synchronization protocol synchronizes time of the first clock with the time of a time source device, and measures a staying time, in the communication apparatus, of a packet to be transferred to a second communication apparatus or the time source device, with consideration of the time of the second clock.

9 Claims, 11 Drawing Sheets

COMMUNICATION APPARATUS, CONTROL METHOD FOR COMMUNICATION APPARATUS, AND STORAGE MEDIUM

BACKGROUND

Field of the Disclosure

Aspects of the present disclosure generally relate to a time synchronization technique.

Description of the Related Art

Recently, a technique which synchronizes a plurality of apparatuses with each other to cause the plurality of apparatuses to operate as a system has been in use in many fields. As an example, that technique is being used to create a free viewpoint video by generating an image with an optional viewpoint using images synchronously captured by a plurality of cameras. To create a free viewpoint video with a high definition, a plurality of cameras needs to acquire images by performing synchronous image capturing with a high degree of accuracy. For that purpose, as a technique which performs time synchronization between communication apparatuses which perform image capturing control of the respective cameras (Hereinafter referred to simply as "communication apparatuses"), Precision Time Protocol (PTP) is being used extensively.

In PTP, the communication apparatus is able to include an ordinary clock (OC) function and a transparent clock (TC) function.

The OC function is a function with which the communication apparatus synchronizes its time to the time of a time server having an accurate time source. The time of the communication apparatus is, specifically, time of a PTP Hardware Clock (PHC) mounted in the communication apparatus.

The TC function is a function with which, in a case where a time server and a second communication apparatus are interconnected via a communication apparatus, the communication apparatus synchronizes time of the second communication apparatus with the time of the time server with use of a packet for time synchronization using the PTP (a time synchronization packet). Specifically, the TC function corresponds to, when transferring the time synchronization packet to the second communication apparatus, the communication apparatus measuring a staying time of the time synchronization packet within the communication apparatus, appending information about the measured staying time to the time synchronization packet, and transferring, to the second communication apparatus, the time synchronization packet with the information about the staying time appended thereto. The measurement of the staying time is performed with use of a PHC included in the communication apparatus.

Japanese Patent Application Laid-Open No. 2018-191226 discusses an apparatus capable of executing the OC function and the TC function.

In a case where a communication apparatus capable of executing the OC function and the TC function measures a staying time of the time synchronization packet with use of a PHC mounted in the communication apparatus, it may be difficult for the communication apparatus to measure an accurate staying time. For example, in a case where correction (such as updating) of the PHC has occurred when the time synchronization packet is staying in the communication apparatus, incrementing of the PHC becomes discontinuous due to such updating, so that it becomes difficult for the communication apparatus to measure an accurate staying time. In such a case, a time synchronization packet to which information about an inaccurate staying time has been appended is transferred to a second communication apparatus, and, as a result, a state in which time of the second communication apparatus is not synchronized with time of the time server may be brought about.

SUMMARY

Aspects of the present disclosure are generally provide for, even in a case where correction of a clock mounted in a communication apparatus has occurred, accurately measuring a staying time, in the communication apparatus, of a packet to be transferred.

According to an aspect of the present disclosure, a communication apparatus including a first clock and a second clock which operate according to a predetermined time synchronization protocol includes a time synchronization unit configured to synchronize time of the first clock with time of a time source device, and a measurement unit configured to measure a staying time, in the communication apparatus, of a packet to be transferred to a second communication apparatus or the time source device, with use of time of the second clock.

Further features of the present disclosure will become apparent from the following description of embodiments with reference to the attached drawings.

DESCRIPTION OF THE EMBODIMENTS

Various embodiments, features, and aspects of the disclosure will be described in detail below with reference to the drawings. Furthermore, embodiments described below are examples of implementation methods for the disclosure and can be modified or altered depending on configurations of apparatuses to which the disclosure is applied and various conditions, and the disclosure is not limited to the embodiments described below. Moreover, not all of the combinations of features described in the embodiments are essential for solutions in the disclosure.

[Overall Configuration of Synchronous Image Capturing System]

Figure 1:
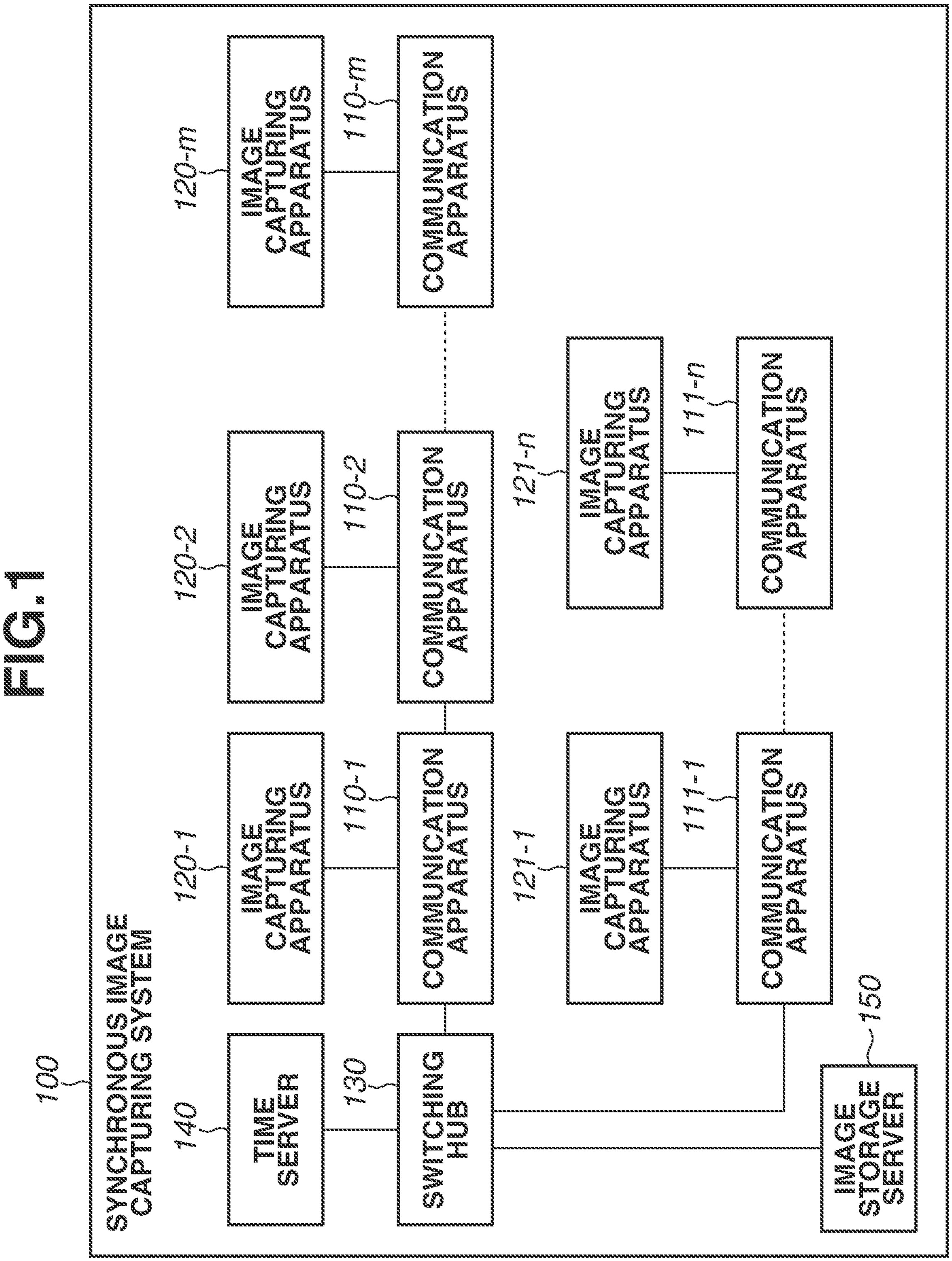
FIG. 1 is an overall configuration diagram of a synchronous image capturing system according to a first embodiment.

FIG. 1 is an overall configuration diagram of a synchronous image capturing system according to a first embodiment. The synchronous image capturing system 100 includes communication apparatuses 110-1 to 110-*m*, communication apparatuses 111-1 to 111-*n*, a switching hub 130, a time server 140, and an image storage server 150. Each of "m" and "n" is an integer greater than or equal to "2". Each of a set of the communication apparatuses 110-1 to 110-*m* and a set of the communication apparatuses 111-1 to 111-*n* is connected to the switching hub 130 in a daisy chain configuration. The communication apparatuses 110-1 to 110-*m* are connected to image capturing apparatuses, such as cameras, 120-1 to 120-*m*, respectively, and the communication apparatuses 111-1 to 111-*n* are connected to image capturing apparatuses, such as cameras, 121-1 to 121-*n*, respectively.

The time server 140 is a reference time source device configured to include an accurate time source (clock). The time source is, for example, the Global Positioning System (GPS) or an atomic clock. Alternatively, the time source can be another type of time source, such as an oven-controlled crystal (X-tal) oscillator (OCXO). The time source can be set according to the required accuracy of the synchronous image capturing system 100. While, in FIG. 1, a single time server 140 is illustrated, a plurality of time servers 140 can be used for the purpose of securing redundancy.

The time server 140 synchronizes the communication apparatuses 110-1 to 110-*m* and the communication apparatuses 111-1 to 111-*n* with time of the time server 140 according to a predetermined time synchronization protocol. In the first embodiment, the Precision Time Protocol (PTP) is used as the time synchronization protocol.

The image storage server 150 is a server which stores pieces of image data included in image packets received from the communication apparatuses 110-1 to 110-*m* and the communication apparatuses 111-1 to 111-*n*.

The image packets are packets including pieces of image data generated by the communication apparatuses 110-1 to 110-*m* and the communication apparatuses 111-1 to 111-*n* from pieces of captured data generated by the image capturing apparatuses 120-1 to 120-*m* and the image capturing apparatuses 121-1 to 121-*n*. The image storage server 150 is configured to have a capacity capable of storing all of the pieces of image data included in the image packets transmitted from the communication apparatuses 110-1 to 110-*m* and the communication apparatuses 111-1 to 111-*n*. Furthermore, in the description of the first embodiment, unless otherwise stated, the term "image" is assumed to include the concepts of a moving image and a still image. Thus, the synchronous image capturing system 100 in the first embodiment is assumed to be able to process both a still image and a moving image.

A network in the synchronous image capturing system 100 is configured with, for example, Gigabit Ethernet (1 GbE), 10 Gigabit Ethernet (10 GbE), or 100 Gigabit Ethernet (100 GbE), which is compliant with the IEEE standard for Ethernet. Alternatively, the network can also be configured with a combination of, for example, Interconnect (InfiniBand) and Industrial Ethernet. Moreover, these are examples, and the network can be another type of network. Moreover, to perform redundancy, a configuration obtained by doubling networks can be employed.

Each of a set of the communication apparatuses 110-1 to 110-*m* and a set of the communication apparatuses 111-1 to 111-*n* includes two or more interfaces for communication to enable daisy chain connection. Each of the communication apparatuses 110-1 to 110-*m* and the communication apparatuses 111-1 to 111-*n* internally includes a clock called a "PTP Hardware Clock (PHC)", and synchronizes time of the PHC with time of the time server 140. Such time synchronization is performed by executing a time synchronization sequence using the PTP. The communication apparatuses 110-1 to 110-*m* and the communication apparatuses 111-1 to 111-*n* generate image capturing control signals including synchronization signals representing image capturing timing based on the PHCs synchronized with the time server 140, and transmit the image capturing control signals to the image capturing apparatuses 120-1 to 120-*m* and the image capturing apparatuses 121-1 to 121-*n*.

In the synchronous image capturing system 100, the communication apparatus 110-1 is connected to the time server 140 via the switching hub 130 and is also connected to the communication apparatus 110-2. The communication apparatus 110-1 has the function of transmitting an image packet received from the communication apparatus 110-2 to the image storage server 150 via the switching hub 130.

Moreover, the communication apparatus 110-1 synchronizes time of the communication apparatus 110-1 itself with time of the time server 140 by transmitting a time synchronization packet to the time server 140 and receiving a time synchronization packet from the time server 140. The function of synchronizing time of a communication apparatus with time of a time server is called an ordinary clock (OC) function. In the case of the communication apparatus 110-1, the function of synchronizing time of the communication apparatus 110-1 with time of the time server 140 is equivalent to the OC function.

Additionally, the communication apparatus 110-1 executes a synchronization sequence using the PTP to synchronize time of the communication apparatus 110-2 with time of the time server 140 (in other words, relays (transfers) a time synchronization packet). The function of executing the synchronization sequence using the PTP to synchronize time of a time server with time of a second communication apparatus connected to the communication apparatus is called a transparent clock (TC) function. In the case of the communication apparatus 110-1, the function of relaying a time synchronization packet to synchronize time of the communication apparatus 110-2 with time of the time server 140 is equivalent to the TC function.

In the first embodiment, the time synchronization packet is a packet conforming to the PTP, and is used to execute the time synchronization sequence. The time synchronization packet includes a Sync packet (a packet including a Sync message), a Follow Up packet (a packet including a Follow Up message), a Delay Request packet (a packet including a Delay Request message), and a Delay Response packet (a packet including a Delay Response message).

The switching hub 130 is a switching hub capable of executing a time synchronization packet using the PTP between the time server 140 and the communication apparatuses 110-1 to 110-*m* and the communication apparatuses 111-1 to 111-*n*. The switching hub 130 has the TC function.

The image capturing apparatuses 120-1 to 120-*m* and the image capturing apparatuses 121-1 to 121-*n* are configured to perform image capturing at image capturing timings communicated by image capturing control signals received from the communication apparatuses 110-1 to 110-*m* and the communication apparatuses 111-1 to 111-*n*. Additionally, the image capturing apparatuses 120-1 to 120-*m* and the image capturing apparatuses 121-1 to 121-*n* are configured to transmit pieces of image data obtained by image capturing to the communication apparatuses 110-1 to 110-*m* and the communication apparatuses 111-1 to 111-*n*.

The image capturing apparatuses 120-1 to 120-*m* and the image capturing apparatuses 121-1 to 121-*n* do not need to have the same configuration but, for example, can be configured with apparatuses of respective different models. Moreover, each image capturing apparatus can include a distance measuring sensor of, for example, the light detection and ranging (LiDAR) type or the radio detecting and ranging (RADAR) type.

The image capturing control signal includes setting information regarding the image capturing apparatuses 120-1 to 120-*m* and the image capturing apparatuses 121-1 to 121-*n* and a synchronization signal indicating image capturing timing. The synchronization signal can include, for example, a Genlock signal, which is a pulse signal communicating accurate image capturing timing (interval), and a Timecode signal. The image capturing apparatuses 120-1 to 120-*m* and the image capturing apparatuses 121-1 to 121-*n* perform image capturing at the timings arranged based on the synchronization signal, thus being able to perform image capturing with a fixed period and at the arranged image capturing time between all of the image capturing apparatuses.

[Configuration of Communication Apparatus]

Figure 2:
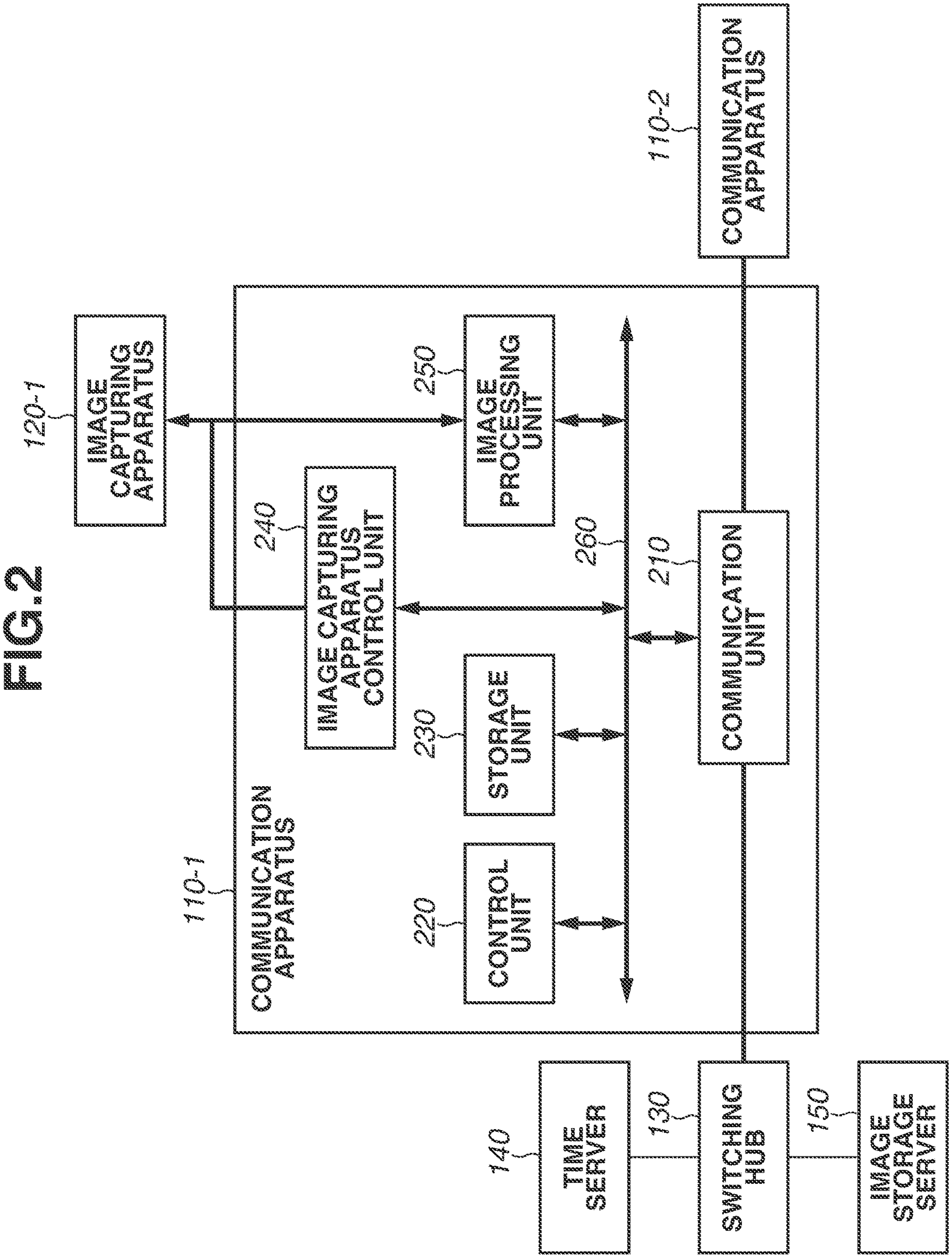
FIG. 2 is a block diagram illustrating an internal configuration of a communication apparatus according to the first embodiment.

FIG. 2 is a block diagram illustrating an internal configuration of the communication apparatus 110-1. Furthermore, the communication apparatuses 110-2 to 110-*m* and the communication apparatuses 111-1 to 111-*n* also have configurations similar to the configuration illustrated in FIG. 2. The communication apparatus 110-1 is configured with a communication unit 210, a control unit 220, a storage unit 230, an image capturing apparatus control unit 240, and an image processing unit 250. The respective functional blocks 210 to 250 are interconnected via a system bus 260, so that various pieces of information are exchanged between the respective functional blocks 210 to 250.

The communication unit 210 includes two interfaces for communication (communication IFs), in which one communication IF is connected to the time server 140 and the image storage server 150 via the switching hub 130 and the other communication IF is connected to the communication apparatus 110-2. Moreover, the communication unit 210 further includes an interface for connecting to the system bus 260.

The communication unit 210 has the function of transmitting a communication packet received from a network to the system bus 260 and, on the other hand, making various pieces of data received from the system bus 260 into a communication packet and transmitting the communication packet to a desired network. The communication packet can be a time synchronization packet, an image packet, or a control packet. The control packet is a packet including control information for performing control of the communication apparatus 110-1 or the image capturing apparatus 120-1.

Moreover, the communication unit 210 includes a PHC mounted therein, and performs correction of the PHC according to the time synchronization sequence. This enables time of the communication apparatus 110-1 (i.e., time of the PHC included in the communication unit 210) to be synchronized with time of the time server 140.

An internal configuration of the communication unit 210 is described below with reference to FIG. 3.

The control unit 220 performs control of the entire communication apparatus 110-1. For example, the control unit 220 performs processing for transmitting an image packet including image data, received from the communication apparatus 110-2, to the image storage server 150. Moreover, the control unit 220 performs control for packetizing image data generated by the image processing unit 250 to generate an image packet and transmitting the image packet to the image storage server 150 at predetermined timing. Additionally, the control unit 220 performs control for performing a time synchronization sequence using the PTP.

The storage unit 230 is a main storage device which is used to store information and data required for the communication unit 210, the control unit 220, the image capturing apparatus control unit 240, and the image processing unit 250. The storage unit 230 is mainly configured with, for example, a semiconductor memory such as a dynamic random access memory (DRAM). The information and data to be stored include various pieces of information and various pieces of data which the communication unit 210, the control unit 220, the image capturing apparatus control unit 240, and the image processing unit 250 handle or treat, and can also include setting information regarding the image capturing apparatus 120-1.

The image capturing apparatus control unit 240 generates a control signal for the image capturing apparatus 120-1 based on the PHC included in the communication unit 210, and transmits the control signal to the image capturing apparatus 120-1. The control signal includes a synchronization signal for issuing an instruction for image capturing timing to the image capturing apparatus 120-1. As mentioned above, the synchronization signal can include, for example, a Genlock signal and a Timecode signal, which are pulse waveforms.

The image processing unit 250 performs image processing on captured data received from the image capturing apparatus 120-1, thus generating image data. The image processing includes processing such as clipping of a background or foreground. The image processing unit 250 stores the generated image data in the storage unit 230.

[Configuration of Communication Unit]

Figure 3:
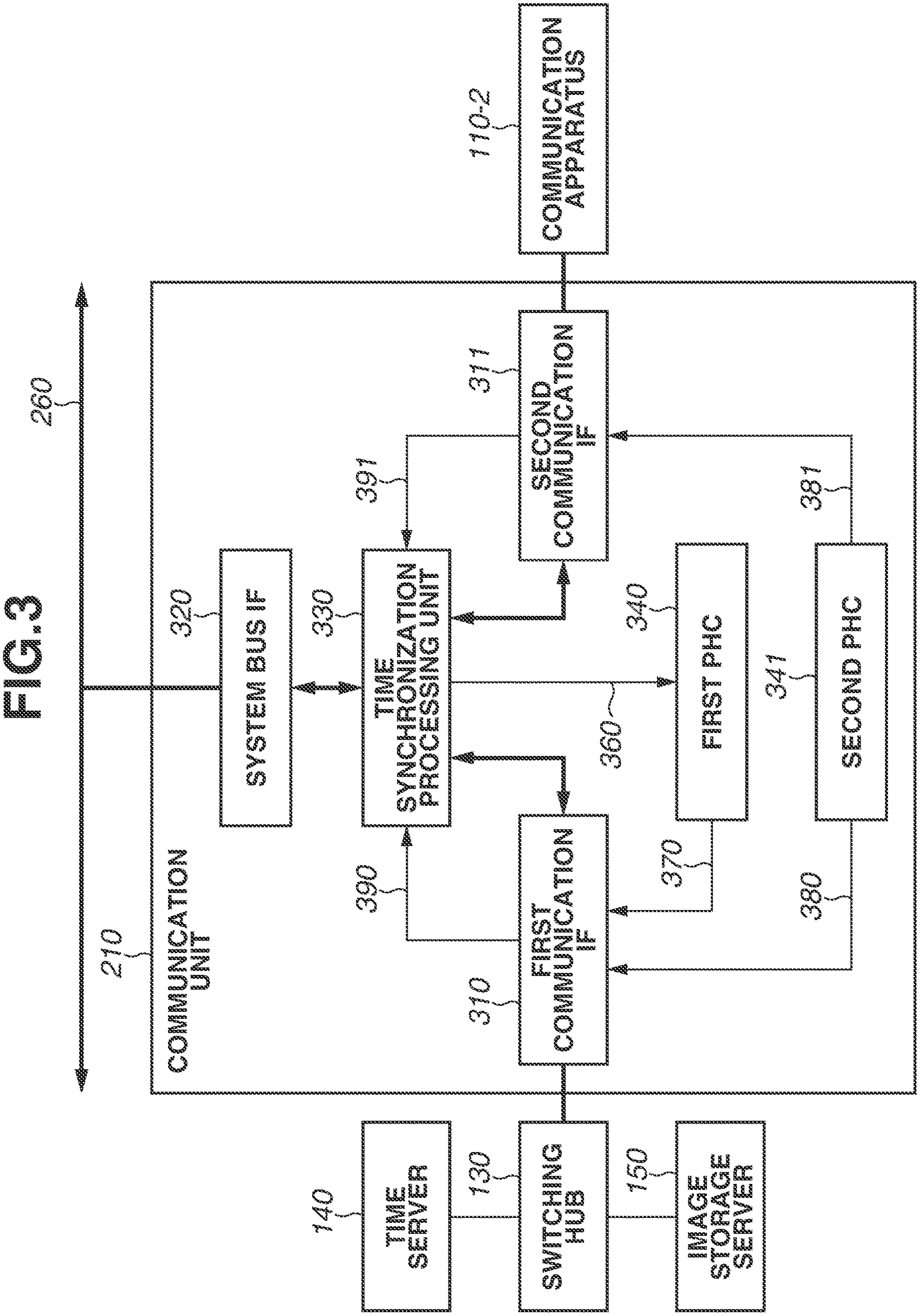
FIG. 3 is a block diagram illustrating an internal configuration of a communication unit included in the communication apparatus according to the first embodiment.

FIG. 3 is a block diagram illustrating an internal configuration of the communication unit 210 according to the first embodiment, which is included in the communication apparatus 110-1 illustrated in FIG. 2. Furthermore, the communication unit 210 included in each of the communication apparatuses 110-2 to 110-*m* and the communication apparatuses 111-1 to 111-*n* also has a configuration similar to the configuration illustrated in FIG. 3.

The communication unit 210 includes three interfaces, i.e., a first communication IF 310, a second communication IF 311, and a system bus IF 320. Moreover, the communication unit 210 includes a time synchronization processing unit 330, a first PHC 340, a second PHC 341, and signal lines 360, 370, 380, 381, 390, and 391.

The first communication IF 310 is a communication interface for connecting to the time server 140 and the image storage server 150 via the switching hub 130. The second communication IF 311 is a communication interface for connecting to the communication apparatus 110-2. The first communication IF 310 and the second communication IF 311 have the same configuration and has the same function. Each of the first communication IF 310 and the second communication IF 311 transmits and receives a communication packet via a network. The communication packet can be a control packet, an image packet, or a time synchronization packet. Each of the first communication IF 310 and the second communication IF 311 is configured to determine (identify) whether the communication packet received via the network is a control packet, an image packet, or a time synchronization packet. As mentioned below, the operation of the communication apparatus 110-1 differs according to a communication IF (i.e., the first communication IF 310 or the second communication IF 311) which has received the communication packet and a type of the communication packet.

The system bus IF 320 is an interface for performing transmission and reception of data between the communication unit 210 and the system bus 260. The system bus IF 320 is mainly used for accessing the storage unit 230 on the system bus 260 under the control of the control unit 220.

The time synchronization processing unit 330 executes the TC function and the OC function according to the time synchronization sequence under the control of the control unit 220. The TC function and the OC function are described below with reference to FIGS. 4A and 4B.

Each of the first PHC 340 and the second PHC 341 is a clock mounted in the communication apparatus 110-1 and is configured with a counter which is configured to be incremented each time a predetermined unit time has elapsed. The first PHC 340 and the second PHC 341 are used for time synchronization in the first embodiment. The time synchronization in the first embodiment is described below with reference to FIGS. 5A and 5B.

As mentioned above, in the communication unit 210, the operation of the communication apparatus 110-1 differs according to a communication IF (i.e., the first communication IF 310 or the second communication IF 311) which has received the communication packet and a type of the communication packet. Here, the operation of the communication apparatus 110-1 performed according to a communication packet received by each of the first communication IF 310 and the second communication IF 311 is described.

<Case where the Communication Packet has been Received by the First Communication IF 310>

In a case where the communication packet received by the first communication IF 310 is a control packet, the control unit 220 temporarily stores the control packet in the storage unit 230 and then analyzes the control packet to acquire control information. After that, the control unit 220 controls the communication apparatus 110-1 to perform control according to the control information.

In a case where the communication packet received by the first communication IF 310 is a time synchronization packet, the communication apparatus 110-1 executes a time synchronization sequence. The time synchronization sequence is described below with reference to FIGS. 4A and 4B.

Furthermore, the first communication IF 310 of the communication apparatus 110-1 is connected to the time server 140 and may not be connected to any other communication apparatus and, therefore, may not receive an image packet.

<Case where the Communication Packet has been Received by the Second Communication IF 311>

In a case where the communication packet received by the second communication IF 311 is an image packet, the control unit 220 temporarily stores the image packet in the storage unit 230, and then controls the first communication IF 310 to transmit the image packet to the image storage server 150 at predetermined timing.

In a case where the communication packet received by the second communication IF 311 is a control packet, the control unit 220 temporarily stores the control packet in the storage unit 230 and then analyzes the control packet to acquire control information. After that, the control unit 220 controls the communication apparatus 110-1 to perform control according to the control information.

In a case where the communication packet received by the second communication IF 311 is a time synchronization packet, the communication apparatus 110-1 executes a time synchronization sequence. The time synchronization sequence is described below with reference to FIGS. 4A and 4B.

Furthermore, as mentioned above, the captured data received from the image capturing apparatus 120-1 connected to the communication apparatus 110-1 is subjected to image processing by the image processing unit 250, so that image data is generated. The control unit 220 packetizes the image data to generate an image packet, and controls the first communication IF 310 to transmit the image packet to the image storage server 150 at predetermined timing.

[Time Synchronization Sequence Using the PTP]

Figure 4B:
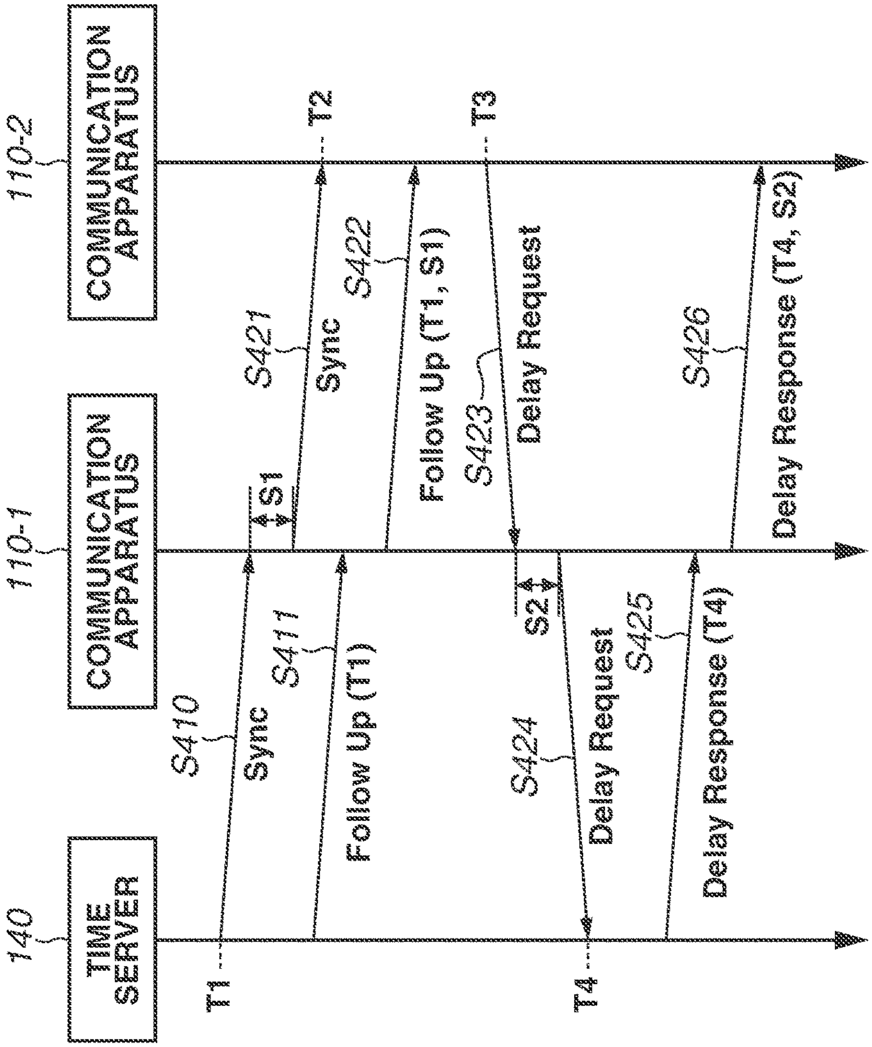
FIGS. 4A and 4B are diagrams each used to explain a time synchronization sequence according to the first embodiment.
Figure 4A:
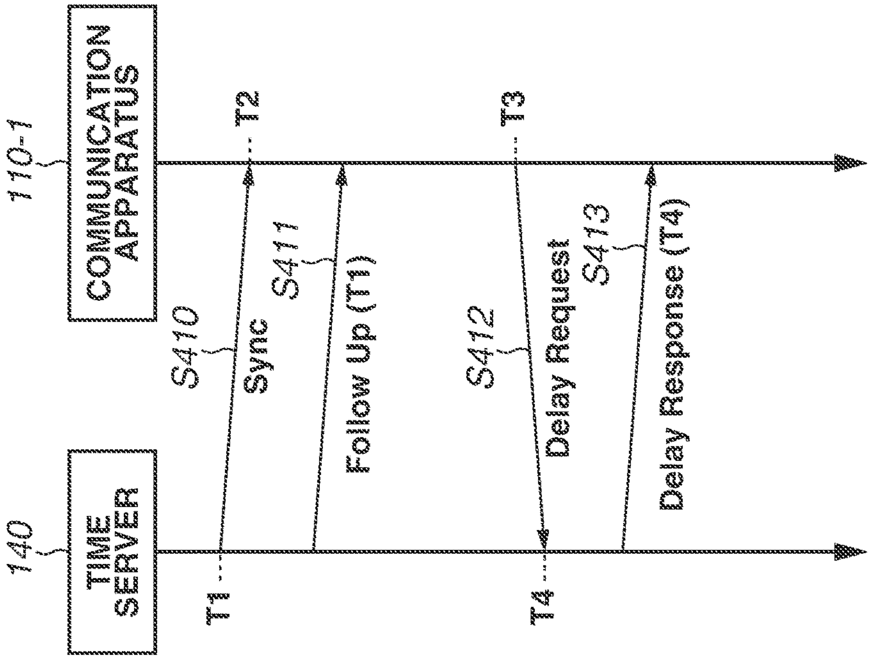

Next, a time synchronization sequence using the PTP, which the communication apparatus 110-1 executes when a time synchronization packet has been received by the first communication IF 310 or the second communication IF 311, is described with reference to FIGS. 4A and 4B. FIGS. 4A and 4B are diagrams each used to explain a time synchronization sequence which is executed in the synchronous image capturing system 100 illustrated in FIG. 1. Specifically, FIG. 4A is a diagram used to explain an OC function for synchronizing time of the communication apparatus 110-1 with time of the time server 140. Moreover, FIG. 4B is a diagram used to explain a TC function for synchronizing time of the time server 140 and time of the communication apparatus 110-2 with each other.

For simplicity of the description, in FIGS. 4A and 4B, the switching hub 130, which has the TC function, is omitted from illustration. Moreover, in describing the time synchronization sequence, the configurations of the synchronous image capturing system 100 illustrated in FIG. 1 and the communication apparatus 110-1 (the same applying to the communication apparatus 110-2) illustrated in FIG. 2 and FIG. 3 are referred to.

First, the OC function is described with reference to FIG. 4. First, in step S410, the time server 140 transmits a Sync packet. Additionally, in step S411, in a case where synchronization processing for the time server 140 is running with two steps, the time server 140 transmits a Follow Up packet. The Sync packet and the Follow Up packet are transmitted by multicast. In step S412, the communication apparatus 110-1, having received the Sync packet and the Follow Up packet, transmits a Delay Request packet to the time server 140. In step S413, the time server 140, having received the Delay Request packet, transmits a Delay Response packet to the communication apparatus 110-1.

In FIG. 4A, time T1 represents time at which the time server 140 transmitted the Sync packet, and time T2 represents time at which the communication apparatus 110-1 received the Sync packet. Moreover, time T3 represents time at which the communication apparatus 110-1 transmitted the Delay Request packet, and time T4 represents time at which the time server 140 received the Delay Request packet. The time T1 is stored in the Follow Up packet (in step S411), and the time T4 is stored in the Delay Response packet (in step S413).

The time synchronization processing unit 330 of the communication apparatus 110-1 is able to acquire the time T1 and the time T2 from the received Follow Up packet (in step S411) and the Delay Response packet (in step S413).

Moreover, the time synchronization processing unit 330 of the communication apparatus 110-1 is configured to acquire the reception time T2 of the Sync packet and the transmission time T3 of the Delay Request packet. The acquisition procedure for the time T2 and the time T3 by the time synchronization processing unit 330 of the communication apparatus 110-1 is described with reference to FIG. 3. The first communication IF 310 latches time information about the first PHC 340, which is being communicated in real time via the signal line 370, at timing when the first communication IF 310 has detected (received) the Sync packet. Then, the first communication IF 310 communicates the latched time information to the time synchronization processing unit 330 via the signal line 390. This enables the time synchronization processing unit 330 to acquire the time T2. With regard to the time T3, similarly, the first communication IF 310 latches time information about the first PHC 340, which is being communicated in real time via the signal line 370, at timing when the Delay Request packet is sent out from the first communication IF 310 to the time server 140. Then, the first communication IF 310 communicates the latched time information to the time synchronization processing unit 330 via the signal line 390. This enables the time synchronization processing unit 330 to acquire the time T3.

By the above-described time synchronization sequence, the synchronization processing unit 330 of the communication apparatus 110-1 is able to acquire four times T1 to T4. Based on the four times, the time synchronization processing unit 330 is able to derive (calculate) an average transmission path delay between the time server 140 and the communication apparatus 110-1 and a time difference between the time server 140 and the communication apparatus 110-1, i.e., a time correction amount in the communication apparatus 110-1, as follows:

$$\text{Average transmission path delay}=((T4-T1)-(T3-T2))/2 \quad (1),\text{ and}$$

$$\text{Time correction amount}=((T2-T1)-(T4-T3))/2 \quad (2).$$

The time correction amount calculated by formula (2) is an offset amount of the communication apparatus 110-1 relative to the time server 140. The time synchronization processing unit 330 of the communication apparatus 110-1 adjusts the amount of gain of the first PHC 340 via the signal line 360 in such a manner that the offset amount becomes "0".

With this adjustment, time synchronization between the communication apparatus 110-1 and the time server 140 is attained.

Next, the TC function is described with reference to FIG. 4B. FIG. 4B illustrates a case where, in transmission and reception of a time synchronization packet between the time server 140 and the communication apparatus 110-2, the communication apparatus 110-1 operates in End to End (E2E) mode of the TC function. The time server 140 transmitting a Sync packet (in step S410), a Follow Up packet (in step S411), and a Delay Response packet (in step S425) is similar to that illustrated in FIG. 4A. Moreover, the communication apparatus 110-1 receiving the Sync packet (in step S410), the Follow Up packet (in step S411), and the Delay Response packet (in step S425) and transmitting a Delay Request (in step S424) is also similar to that illustrated in FIG. 4A.

In FIG. 4B, in step S421, the communication apparatus 110-1 transfers the Sync packet received from the time server 140 to the communication apparatus 110-2, and calculates a time (a staying time) S1 for which the Sync packet has been staying in the communication apparatus 110-1. The calculation procedure for the staying time S1 is described with reference to FIG. 3. The first communication IF 310 of the communication apparatus 110-1 latches time information about the second PHC 341, which is being communicated in real time via the signal line 380, at timing when the first communication IF 310 has detected (received) the Sync packet. Then, the first communication IF 310 communicates the latched time information to the time synchronization processing unit 330 via the signal line 390. Similarly, the second communication IF 311 latches time information about the second PHC 341, which is being communicated in real time via the signal line 381, at timing when the second communication IF 311 sends out the Sync packet.

Then, the second communication IF 311 communicates the latched time information to the time synchronization processing unit 330 via the signal line 391. The time synchronization processing unit 330 calculates a difference between time indicated by the time information communicated via the signal line 391 and time indicated by the time information communicated via the signal line 390, thus being able to acquire the staying time S1.

In step S422, the communication apparatus 110-1 appends information about the staying time S1 to the subsequently received Follow Up packet (in step S411) and transmits the Follow Up packet with information about the staying time S1 appended thereto to the communication apparatus 110-2. Moreover, when, in step S424, transmitting, to the time server 140, a Delay Request packet received from the communication apparatus 110-2 (in step S423), the time synchronization processing unit 330 of the communication apparatus 110-1 calculates a staying time S2, in the communication apparatus 110-1, of the Delay Request packet.

The calculation processing for the staying time S2 by the synchronization processing unit 330 of the communication apparatus 110-1 is described with reference to FIG. 3. The second communication IF 311 of the communication apparatus 110-1 latches time information about the second PHC 341, which is being communicated in real time via the signal line 381, at timing when the second communication IF 311 has detected (received) the Delay Request packet. Then, the second communication IF 311 communicates the latched time information to the time synchronization processing unit 330 via the signal line 391. Similarly, the first communication IF 310 latches time information about the second PHC 341, which is being communicated in real time via the signal line 380, at timing when the first communication IF 310 sends out the Delay Request packet. Then, the first communication IF 310 communicates the latched time information to the time synchronization processing unit 330 via the signal line 390. The time synchronization processing unit 330 calculates a difference between time indicated by the time information communicated via the signal line 390 and time indicated by the time information communicated via the signal line 391, thus being able to acquire the staying time S2.

In step S426, the communication apparatus 110-1 appends information about the calculated staying time S2 to a Delay Response packet received from the time server 140 (in step S425), and transmits the Delay Response packet with information about the staying time S2 appended thereto to the communication apparatus 110-2. Moreover, the communication apparatus 110-2 acquires time T2 and time T3 by a procedure similar to the above-mentioned procedure. With the above-described time synchronization sequence, the time synchronization processing unit 330 of the communication apparatus 110-2 is able to acquire four times T1 to T4 and two staying times S1 and S2. Subsequently, the time synchronization processing unit 330 of the communication apparatus 110-2 is able to derive (calculate) an average transmission path delay between the time server 140 and the communication apparatus 110-2 and a time correction amount in the communication apparatus 110-2 as follows:

$$\text{Average transmission path delay}=((T2-T3)+(T4-T1)-S1-S2)/2 \quad (3),$$

and $$\text{Time correction amount}=(T2-T1)-\text{Average transmission path delay in formula (3)}-S1 \quad (4).$$

The time correction amount calculated by formula (4) is an offset amount of the communication apparatus 110-2 relative to the time server 140. The time synchronization processing unit 330 of the communication apparatus 110-2 adjusts the amount of gain of time included in the communication apparatus 110-2 in such a manner that the offset amount becomes "0". With this adjustment, time synchronization between the communication apparatus 110-2 and the time server 140 is attained.

In this way, the communication apparatus 110-1 includes two clocks (the first PHC 340 and the second PHC 341). Then, when executing the OC function, the communication apparatus 110-1 uses one clock (the first PHC 340) to acquire time information (time stamp), and, when executing the TC function, the the communication apparatus 110-1 uses the other clock (the second PHC 341) to acquire time information. This enables the communication apparatus 110-1 to, even when adjusting or correcting the first PHC 340, accurately calculate the staying times S1 and S2 with use of time indicated by the second PHC 341.

[Operation Flow of Communication Apparatus 110-1]

Figure 5A:
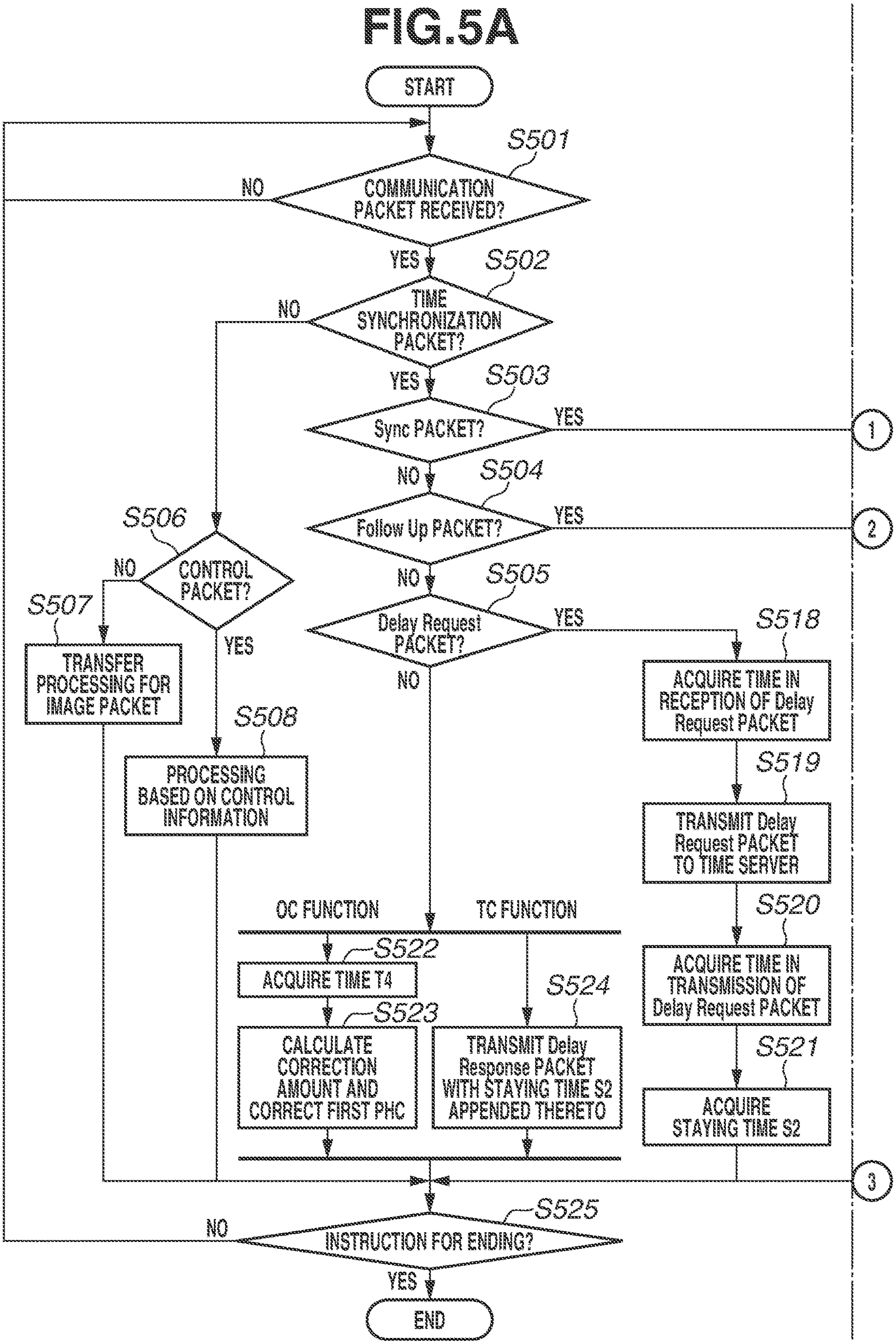
FIGS. 5A and 5B are flowcharts of processing which is performed by the communication apparatus according to the first embodiment.
Figure 5B:
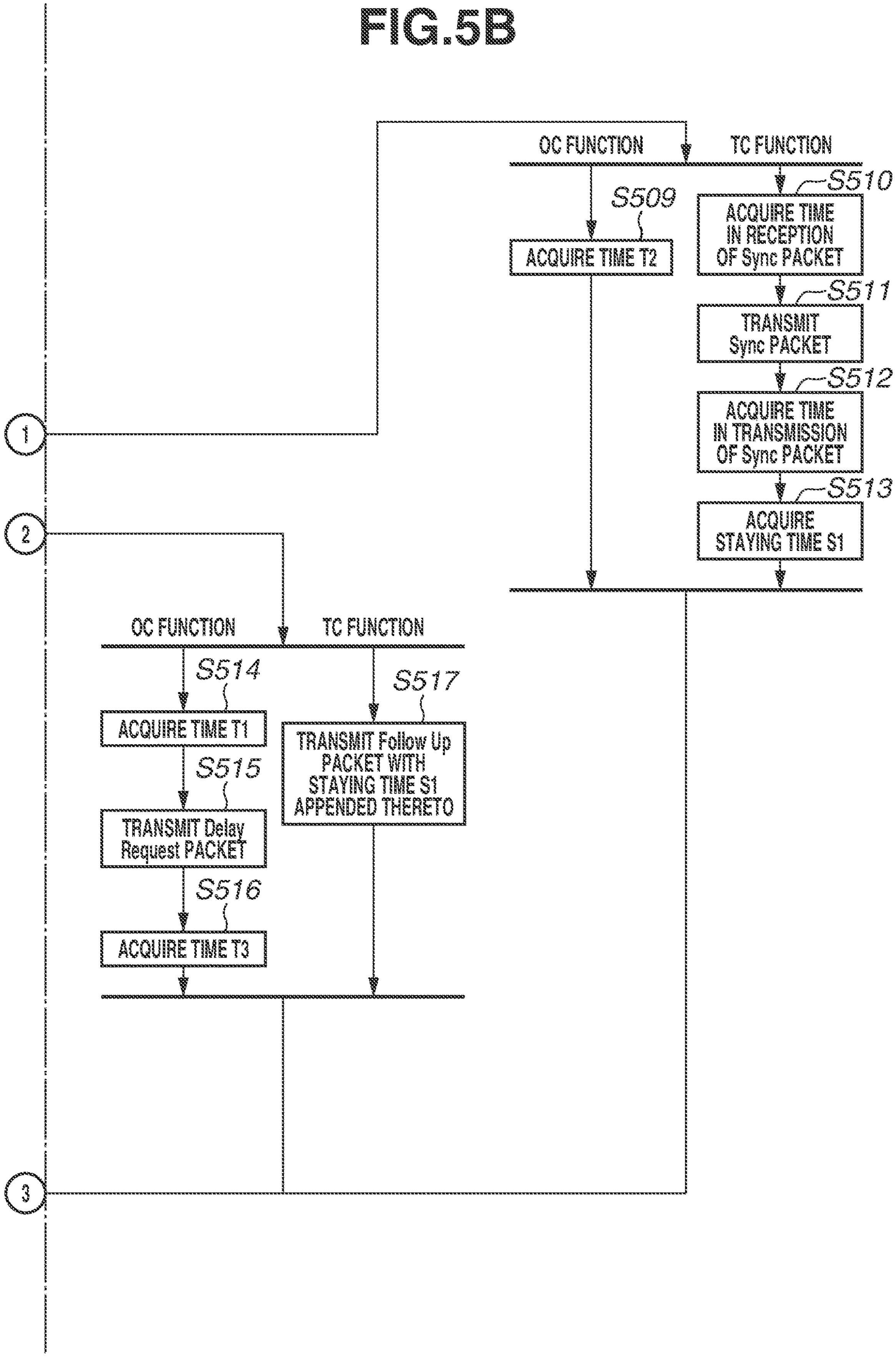

Next, an operation of the communication apparatus 110-1 in the first embodiment is described with reference to FIGS. 5A and 5B. FIGS. 5A and 5B are flowcharts of processing which is performed by the communication apparatus 110-1 in the first embodiment. As illustrated in FIG. 1, in the synchronous image capturing system 100, the communication apparatus 110-1 is connected to the time server 140 and the image storage server 150 via the switching hub 130 and is further connected to the communication apparatus 110-2. In the first embodiment, a case where the communication apparatus 110-1 operates to execute the OC function and the TC function in parallel.

The flow illustrated in FIGS. 5A and 5B starts in a state in which the entire synchronous image capturing system 100 is started up and the communication apparatus 110-1 is completely prepared to execute the time synchronization sequence (see FIGS. 4A and 4B).

In step S501, the communication apparatus 110-1 determines whether a communication packet has been received. Specifically, the first communication IF 310 or the second communication IF 311 of the communication apparatus 110-1 determines whether a communication packet has been received via a network. If it is determined that a communication packet has been received (YES in step S501), the communication apparatus 110-1 advances the processing to step S502, and, if not so (NO in step S501), the communication apparatus 110-1 waits for receiving a communication packet.

In step S502, the communication apparatus 110-1 determines whether the received communication packet is a time synchronization packet. Specifically, the first communication IF 310 or the second communication IF 311 of the communication apparatus 110-1 determines whether the received communication packet is a time synchronization packet. If it is determined that the received communication packet is a time synchronization packet (YES in step S502), the communication apparatus 110-1 advances the processing to step S503, and, if not so (NO in step S502), the communication apparatus 110-1 advances the processing to step S506.

In step S503, the communication apparatus 110-1 determines whether the received communication packet (i.e., the time synchronization packet) is a Sync packet transmitted from the time server 140. Specifically, the first communication IF 310 of the communication apparatus 110-1 communicates header information about the detected communication packet to the control unit 220, and the control unit 220 determines whether the communication packet is a Sync packet, based on the header information. If it is determined that the received time synchronization packet is a Sync packet transmitted from the time server 140 (YES in step S503), the communication apparatus 110-1 advances the processing to step S509 and step S510, and, if not so (NO in step S503), the communication apparatus 110-1 advances the processing to step S504. The received time synchronization packet being a Sync packet transmitted from the time server 140 is equivalent to the communication apparatus 110-1 having received a Sync packet in step S410 illustrated in FIG. 4A or 4B.

In step S504, the communication apparatus 110-1 determines whether the received time synchronization packet is a Follow Up packet transmitted from the time server 140. Specifically, the first communication IF 310 of the communication apparatus 110-1 communicates header information about the detected communication packet to the control unit 220, and the control unit 220 determines whether the communication packet is a Follow Up packet, based on the header information. If it is determined that the received time synchronization packet is a Follow Up packet transmitted from the time server 140 (YES in step S504), the communication apparatus 110-1 advances the processing to step S514 and step S517, and, if not so (NO in step S504), the communication apparatus 110-1 advances the processing to step S505. The received time synchronization packet being a Follow Up packet transmitted from the time server 140 is equivalent to the communication apparatus 110-1 having received a Follow Up packet in step S411 illustrated in FIG. 4A or 4B.

In step S505, the communication apparatus 110-1 determines whether the received time synchronization packet is a Delay Request packet transmitted from the communication apparatus 110-2.

Specifically, the second communication IF 311 of the communication apparatus 110-1 communicates header information about the detected communication packet to the control unit 220, and the control unit 220 determines whether the communication packet is a Delay Request packet, based on the header information. If it is determined that the received time synchronization packet is a Delay Request packet transmitted from the communication apparatus 110-2 (YES in step S505), the communication apparatus 110-1 advances the processing to step S518, and, if not so (NO in step S505), the communication apparatus 110-1 advances the processing to step S522 and step S524. The received time synchronization packet being a Delay Request packet transmitted from the communication apparatus 110-2 is equivalent to the communication apparatus 110-1 having received a Delay Request packet from the communication apparatus 110-2 in step S423 illustrated in FIG. 4B. In a case where the received time synchronization packet is not a Delay Request packet transmitted from the communication apparatus 110-2, the communication apparatus 110-1 is able to determine that the received time synchronization packet is a Delay Response packet. The received time synchronization packet being a Delay Response packet is equivalent to the communication apparatus 110-1 having received a Delay Response packet from the time server 140 in step S425 illustrated in FIG. 4B.

In step S506, the communication apparatus 110-1 determines whether the received communication packet is a control packet. Specifically, the first communication IF 310 or the second communication IF 311 of the communication apparatus 110-1 determines whether the received communication packet is a control packet. If it is determined that the received communication packet is a control packet (YES in step S506), the communication apparatus 110-1 advances the processing to step S508.

If it is determined that the received communication packet is not a control packet (NO in step S506), the communication apparatus 110-1 determines that the received communication packet is an image packet, and advances the processing to step S507. The control packet transmitted from the image storage server 150 is detected by the first communication IF 310, and the control packet transmitted from the communication apparatus 110-2 is detected by the second communication IF 311.

In step S507, the communication apparatus 110-1 transfers an image packet received from the communication apparatus 110-2 to the image storage server 150. As illustrated in FIG. 1, in the first embodiment, image packets are transferred from the communication apparatuses 110-1 to 110-*m* to the image storage server 150. For that purpose, the control unit 220 of the communication apparatus 110-1 temporarily stores an image packet received by the second communication IF 311 in the storage unit 230, and controls the first communication IF 310 in such a way as to transmit the image packet to the image storage server 150 at predetermined timing after that.

In step S508, with respect to the control packet received from the communication apparatus 110-2 or the image storage server 150, the communication apparatus 110-1 performs control according to control information included in the control packet. Specifically, the control unit 220 of the communication apparatus 110-1 temporarily stores a control packet detected by one of the first communication IF 310 and the second communication IF 311 in the storage unit 230. After that, the control unit 220 analyzes the control packet to derive control information, and controls the communication apparatus 110-1 according to the control information.

A processing operation in step S509 corresponds to processing for executing a part of the OC function (see FIG. 4A) in a case where the communication apparatus 110-1 has received the Sync packet (YES in step S503). In step S509, the communication apparatus 110-1 acquires time (time T2 illustrated in FIG. 4A) at which the communication apparatus 110-1 received the Sync packet from the time server 140. Specifically, the time synchronization processing unit 330 of the communication apparatus 110-1 acquires time T2 based on time information about the first PHC 340 according to the procedure described above with reference to FIG. 4A.

Processing operations in step S510 to step S513 correspond to processing for executing a part of the TC function (see FIG. 4B) in a case where the communication apparatus 110-1 has received the Sync packet (YES in step S503).

In step S510, the communication apparatus 110-1 acquires time at which the communication apparatus 110-1 received the Sync packet from the time server 140. Specifically, the time synchronization processing unit 330 of the communication apparatus 110-1 acquires, from the second PHC 341 via the first communication IF 310, time at which the communication apparatus 110-1 received the Sync packet from the time server 140, according to the procedure described above with reference to FIG. 4B.

In step S511, the communication apparatus 110-1 transmits the Sync packet to the communication apparatus 110-2 (in step S421 illustrated in FIG. 4B). Specifically, the control unit 220 of the communication apparatus 110-1 controls the second communication IF 311 in such a way as to transmit the Sync packet to the communication apparatus 110-2.

In step S512, the communication apparatus 110-1 acquires time at which the communication apparatus 110-1 transmitted the Sync packet to the communication apparatus 110-2. Specifically, the synchronization processing unit 330 of the communication apparatus 110-1 acquires, from the second PHC 341 via the second communication IF 311, time at which the communication apparatus 110-1 transmitted the Sync packet to the communication apparatus 110-2, according to the procedure described above with reference to FIG. 4B.

In step S513, the communication apparatus 110-1 calculates and acquires a staying time S1 of the Sync packet. Specifically, the synchronization processing unit 330 of the communication apparatus 110-1 calculates the staying time S1 according to the procedure described above with reference to FIG. 4B. In this way, the staying time S1 is acquired based on time information about the second PHC 341.

Processing operations in step S514 to step S516 correspond to processing for executing a part of the OC function (see FIG. 4A) in a case where the communication apparatus 110-1 has received the Follow Up packet (YES in step S504).

In step S514, the communication apparatus 110-1 acquires time at which the time server 140 transmitted the Sync packet to the communication apparatus 110-1 (time T1 illustrated in FIG. 4A). Specifically, first, the control unit 220 of the communication apparatus 110-1 temporarily stores the Follow Up packet received by the first communication IF 310 in the storage unit 230. After that, the control unit 220 analyzes the Follow Up packet to acquire the time T1 stored in the Follow Up packet. The control unit 220 communicates the time T1 to the time synchronization processing unit 330 via the system bus 260, so that the time synchronization processing unit 330 acquires the time T1.

In step S515, the communication apparatus 110-1 transmits a Delay Request packet to the time server 140. Specifically, the control unit 220 of the communication apparatus 110-1 controls the first communication IF 310 in such a way as to transmit a Delay Request packet to the time server 140 (in step S412 illustrated in FIG. 4A).

In step S516, the communication apparatus 110-1 acquires time at which the communication apparatus 110-1 transmitted the Delay Request packet to the time server 140 (time T3 illustrated in FIG. 4A). Specifically, the synchronization processing unit 330 of the communication apparatus 110-1 acquires the time T3 based on time information about the first PHC 340 according to the procedure described above with reference to FIG. 4A.

A processing operation in step S517 corresponds to processing for executing a part of the TC function (see FIG. 4B)

in a case where the communication apparatus 110-1 has received the Follow Up packet (YES in step S504). In step S517, the communication apparatus 110-1 appends time information about the staying time S1 of the Sync packet acquired in step S513 to the Follow Up packet received from the time server 140 (in step S411 illustrated in FIG. 4B), and transmits the Follow Up packet with time information about the staying time S1 appended thereto to the communication apparatus 110-2 (in step S422 illustrated in FIG. 4B). Therefore, information about the time T1 and the staying time S1 is included in the Follow Up packet to be transmitted to the communication apparatus 110-2.

Processing operations in step S518 to step S521 correspond to processing for executing a part of the TC function (see FIG. 4B) in a case where the communication apparatus 110-1 has received the Delay Request packet (YES in step S505).

In step S518, the communication apparatus 110-1 acquires time at which the communication apparatus 110-1 received the Delay Request packet from the communication apparatus 110-2. Specifically, the synchronization processing unit 330 of the communication apparatus 110-1 acquires, from the second PHC 341 via the second communication IF 311, time at which the the communication apparatus 110-1 received the Delay Request packet from the communication apparatus 110-2, according to the procedure described above with reference to FIG. 4B.

In step S519, the communication apparatus 110-1 transmits the Delay Request packet to the time server 140 (in step S424 illustrated in FIG. 4B). Specifically, the control unit 220 of the communication apparatus 110-1 controls the first communication IF 310 in such a way as to transmit the Delay Request packet to the time server 140.

In step S520, the communication apparatus 110-1 acquires time at which the communication apparatus 110-1 transmitted the Delay Request packet to the time server 140. Specifically, the synchronization processing unit 330 of the communication apparatus 110-1 acquires, from the second PHC 341 via the first communication IF 310, time at which the communication apparatus 110-1 transmitted the Delay Request packet to the time server 140, according to the procedure described above with reference to FIG. 4B.

In step S521, the communication apparatus 110-1 calculates and acquires a staying time S2 of the Delay Request packet. Specifically, the synchronization processing unit 330 of the communication apparatus 110-1 calculates the staying time S2 according to the procedure described above with reference to FIG. 4B. In this way, the staying time S2 is acquired based on time information about the second PHC 341.

Processing operations in step S522 and step S523 correspond to processing for executing a part of the OC function (see FIG. 4A) in a case where the communication apparatus 110-1 has received the Delay Response packet (NO in step S505).

In step S522, the communication apparatus 110-1 acquires time at which the time server 140 received the Delay Request packet from the communication apparatus 110-1 (time T4 illustrated in FIG. 4A). Specifically, first, the control unit 220 of the communication apparatus 110-1 temporarily stores the Delay Response packet received by the first communication IF 310 in the storage unit 230. After that, the control unit 220 analyzes the Delay Response packet to acquire the time T4 stored in the Delay Response packet. The control unit 220 communicates the time T4 to the time synchronization processing unit 330 via the system bus 260, so that the time synchronization processing unit 330 acquires the time T4.

In step S523, the time synchronization processing unit 330 performs time correction of the first PHC 340. Specifically, the time synchronization processing unit 330 calculates the offset amount (time correction amount) by the above-mentioned formula (2) with use of the time T1 to the time T4 acquired in step S514, step S509, step S516, and step S522. The time synchronization processing unit 330 adjusts the amount of gain of the first PHC 340 via the signal line 360 in such a manner that the offset amount becomes "0". With this adjustment, time of the first PHC 340 of the communication apparatus 110-1 is synchronized with time of the time server 140.

A processing operation in step S524 corresponds to processing for executing a part of the TC function (see FIG. 4B) in a case where the communication apparatus 110-1 has received the Delay Response packet (NO in step S505). In step S524, the communication apparatus 110-1 appends time information about the staying time S2 of the Delay Request packet calculated in step S521 to the Delay Response packet received from the time server 140 (in step S425 illustrated in FIG. 4B), and transmits the Delay Request packet with time information about the staying time S2 appended thereto to the communication apparatus 110-2 (in step S426 illustrated in FIG. 4B). Therefore, information about the time T4 and the staying time S2 is included in the Delay Response packet to be transmitted to the communication apparatus 110-2.

In step S525, the communication apparatus 110-1 determines whether to end a synchronous image capturing operation of the synchronous image capturing system 100. For example, the communication apparatus 110-1 determines whether the communication apparatus 110-1 has received an instruction for ending the synchronous image capturing operation from a control terminal (not illustrated), which is operated by the operator. If it is determined to end the synchronous image capturing operation (YES in step S525), the communication apparatus 110-1 ends the processing illustrated in FIGS. 5A and 5B, and, if not so (NO in step S525), the communication apparatus 110-1 returns the processing to step S501.

As illustrated in FIG. 5A, in step S523, according to the OC function, the communication apparatus 110-1 performs correction to synchronize time of the first PHC 340 with time of the time server 140. On the other hand, according to the TC function, the communication apparatus 110-1 acquires pieces of time information for calculating the staying time S1 and the staying time S2 (in step S510, step S512, S518, and step S520), based on time of the second PHC 341. Therefore, even if the OC function operates at any timing, the calculation of a staying time is not affected thereby.

In this way, a communication apparatus in the first embodiment includes two clocks, and, when becoming synchronized in time with a time server (executing the OC function), acquires a time stamp using one clock and, when measuring a staying time (executing the TC function), acquires a time stamp using the other clock. This enables the communication apparatus to accurately acquire a staying time irrespective of timing at which the clock for the OC function is adjusted (corrected) and to transfer a time synchronization packet with a correct staying time included therein to a second communication apparatus. Then, the second communication apparatus, having received the time synchronization packet, becomes able to be correctly synchronized in time with the time server.

Next, a second embodiment is described. In the second embodiment, a configuration for correcting time of the second PHC 341 of the communication apparatus 110-1 is described. In the following description, constituent elements similar to those in the first embodiment are omitted from description.

[Configuration of Communication Unit]

Figure 6:
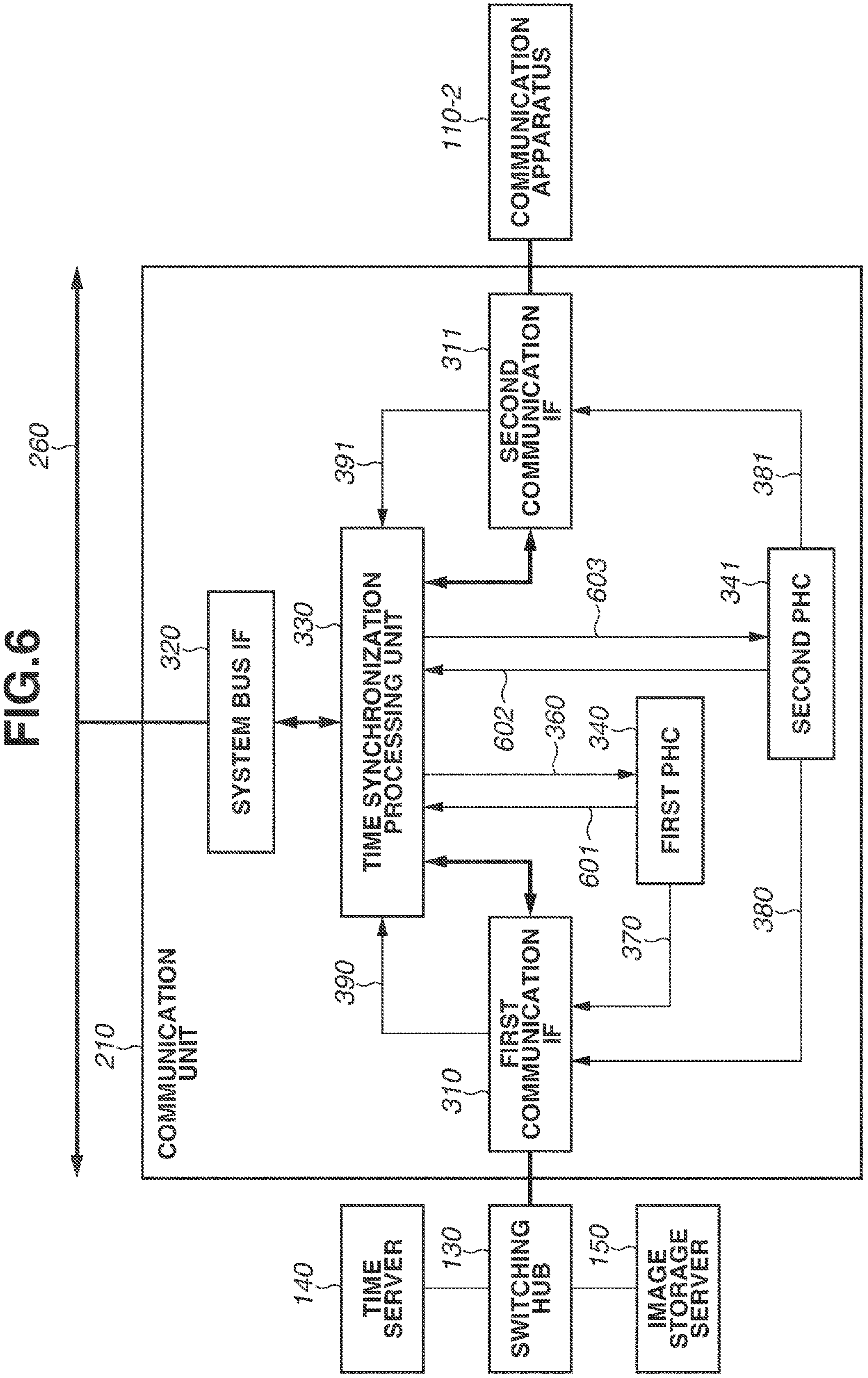
FIG. 6 is a block diagram illustrating an internal configuration of a communication unit included in a communication apparatus according to a second embodiment.

FIG. 6 is a block diagram illustrating an internal configuration of the communication unit 210 in the second embodiment, included in the communication apparatus 110-1 illustrated in FIG. 2. The function of correcting time of the second PHC 341 is added to the communication unit 210 in the first embodiment illustrated in FIG. 3. Specifically, signal lines 601 to 603 are added to the communication unit 210 illustrated in FIG. 3 to correct time of the second PHC 341.

The signal line 601 is a signal line used to communicate time information about the first PHC 340 in real time as with the signal line 370, and is connected to the time synchronization processing unit 330. The signal line 602 is a signal line used to communicate time information about the second PHC 341 in real time as with the signal line 381, and is connected to the time synchronization processing unit 330. The signal line 603 is a signal line used to connect the time synchronization processing unit 330 to the second PHC 341 and to, when correcting time of the second PHC 341, communicate a correction amount therefor to the second PHC 341.

[Operation Flow of Communication Apparatus 110-1]

Figure 7A:
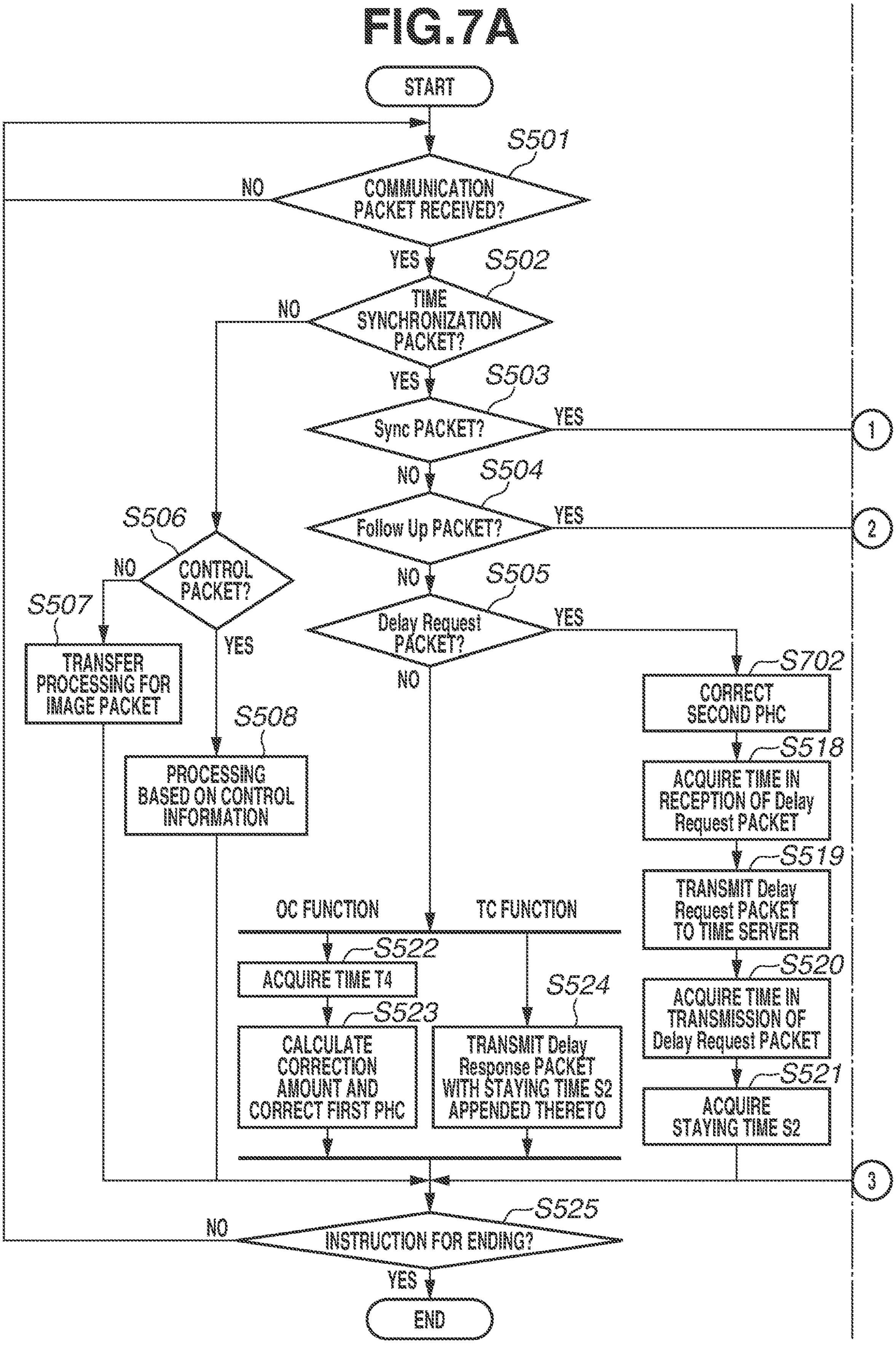
FIGS. 7A and 7B are flowcharts of processing which is performed by the communication apparatus according to the second embodiment.
Figure 7B:
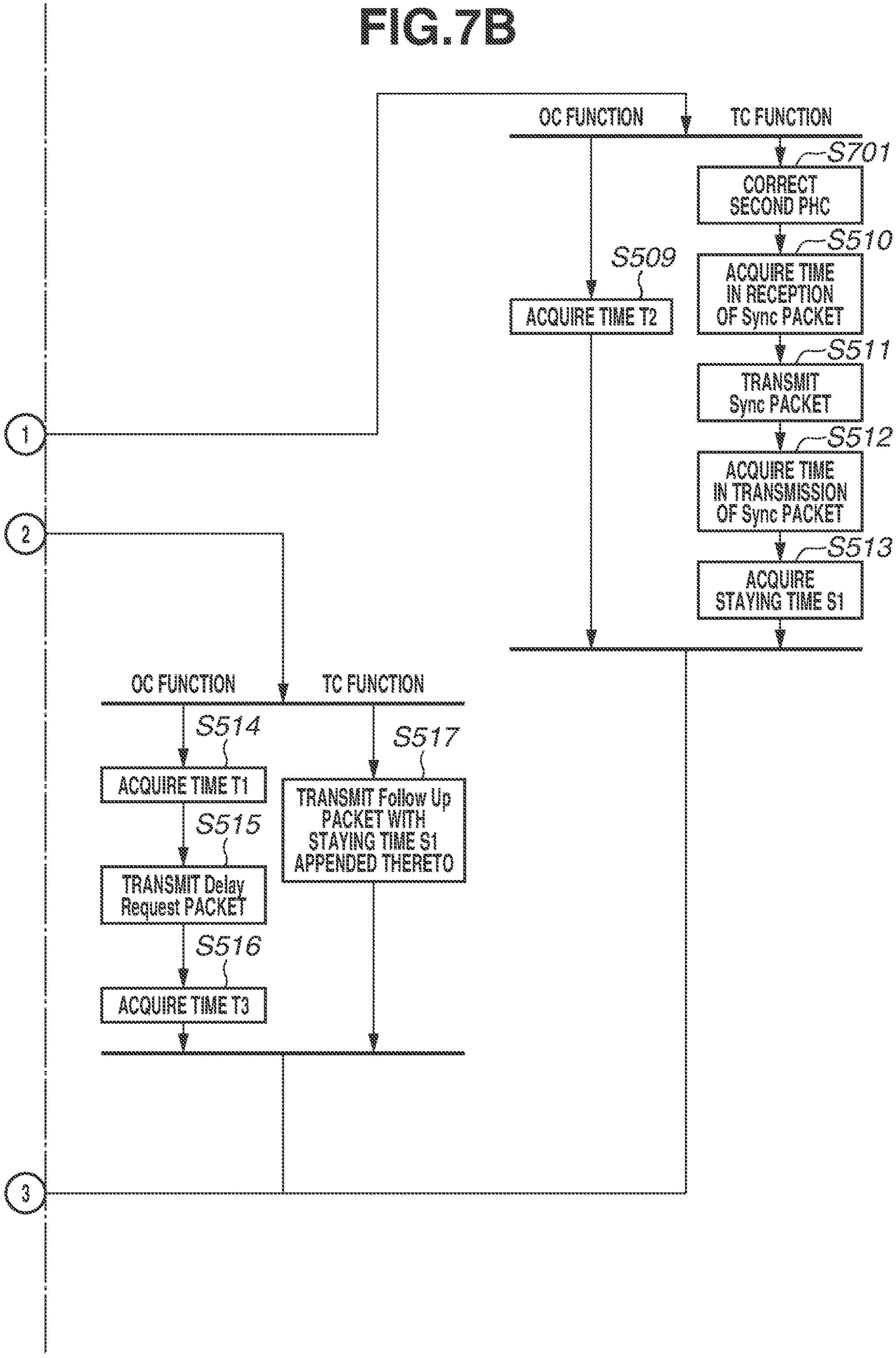

Next, an operation of the communication apparatus 110-1 in the second embodiment is described with reference to FIGS. 7A and 7B. FIGS. 7A and 7B are flowcharts of processing which is performed by the communication apparatus 110-1 in the second embodiment. Processing operations in step S701 and step S702 are added to the flowcharts of FIGS. 5A and 5B described above in the first embodiment, to correct time of the second PHC 341. In the following description, the processing operations in step S701 and step S702 are described.

First, the processing operation in step S701 is described. In FIGS. 7A and 7B, if it is determined that the Sync packet has been received (YES in step S503), then in step S701, before the processing operations in step S510 to step S513 for calculating the staying time S1, the communication apparatus 110-1 corrects time of the second PHC 341. Specifically, first, the synchronization processing unit 330 of the communication apparatus 110-1 acquires time information about the first PHC 340 with use of the signal line 601. Moreover, the synchronization processing unit 330 acquires time information about the second PHC 341 with use of the signal line 602. After acquiring two pieces of time information, the time synchronization processing unit 330 calculates, as a PHC offset amount, a difference between time indicated by the time information about the first PHC 340 and time indicated by the time information about the second PHC 341. Then, the time synchronization processing unit 330 adjusts the amount of gain of the second PHC 341 with use of the signal line 603 in such a manner that the PHC offset amount becomes "0". With this adjustment, time of the first PHC 340 and time of the second PHC 341 are synchronized with each other.

Next, the processing operation in step S702 is described. In FIGS. 7A and 7B, if it is determined that the Delay Request packet has been received (YES in step S505), then in step S702, before the processing operations in step S518 to step S521 for calculating the staying time S2, the communication apparatus 110-1 corrects time of the second PHC 341. The correction procedure for time of the second PHC 341 is similar to that in step S701. Specifically, first, the synchronization processing unit 330 of the communication apparatus 110-1 acquires time information about the first PHC 340 with use of the signal line 601. Moreover, the synchronization processing unit 330 acquires time information about the second PHC 341 with use of the signal line 602. After acquiring two pieces of time information, the time synchronization processing unit 330 calculates, as a PHC offset amount, a difference between time indicated by the time information about the first PHC 340 and time indicated by the time information about the second PHC 341. Then, the time synchronization processing unit 330 adjusts the amount of gain of the second PHC 341 with use of the signal line 603 in such a manner that the PHC offset amount becomes "0". With this adjustment, time of the first PHC 340 and time of the second PHC 341 are synchronized with each other.

While, in FIGS. 7A and 7B, the processing operation in step S701 is performed before the processing operation in step S510 and the processing operation in step S702 is performed before the processing operation in step S518, the second embodiment is not limited to this. The processing operation in step S701, unless being performed during the processing operations in step S510 to step S513, can be performed at different timing. Thus, the processing operation in step S701 can be performed at a time other than the time of processing for measuring the staying time S1 (step S510 to step S513). Similarly, the processing operation in step S702, unless being performed during the processing operations in step S518 to step S521, can be performed at different timing. Thus, the processing operation in step S702 can be performed at a time other than the time of processing for measuring the staying time S2 (step S518 to step S521).

In this way, according to the second embodiment, in addition to the advantageous effect described above in the first embodiment, it becomes possible to adjust a clock used for executing the TC function based on a clock used for executing the OC function. This enables the clock used for executing the TC function to be synchronized with time of the time server.

Next, a third embodiment is described. In the third embodiment, a procedure for correcting time of the second PHC 341, which is performed in each of step S701 and step S702 illustrated in FIGS. 7A and 7B described above in the second embodiment, is described. In the third embodiment, the procedure for correcting time of the second PHC 341 using phase correction and frequency correction is described with reference to FIG. 8 and FIG. 9, respectively.

<Time Correction using Phase Correction>

Figure 8:
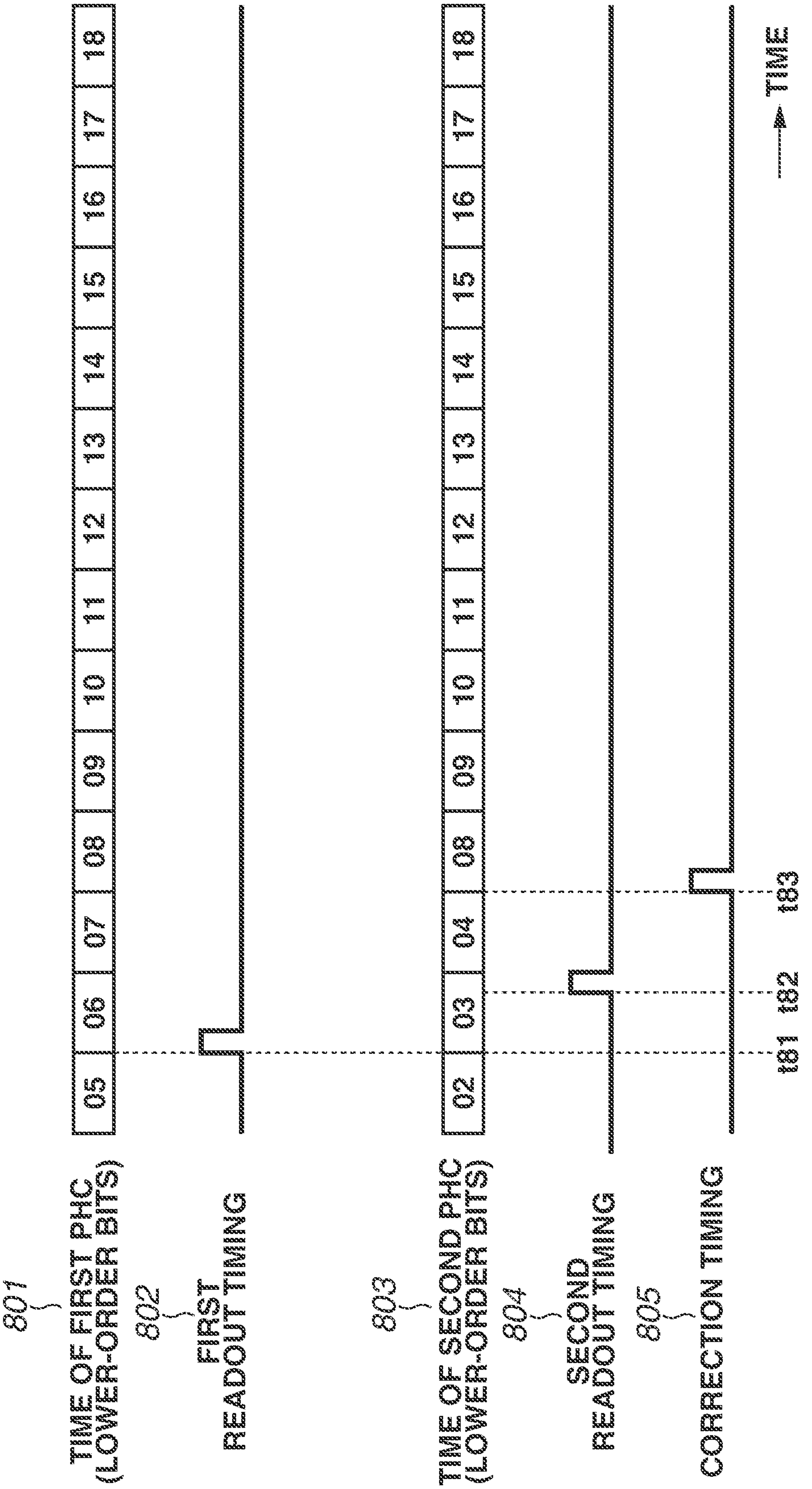
FIG. 8 is a diagram used to explain time correction using phase correction according to a third embodiment.

FIG. 8 is a diagram used to explain time correction using phase correction, and expresses, with passage of time, a procedure for correcting time of the second PHC 341 based on time of the first PHC 340. Time 801 of the first PHC 340 indicates lower-order bits of time information about the first PHC 340. The time 801 of the first PHC 340 is incremented with time. Similarly, time 803 of the second PHC 341 indicates lower-order bits of time information about the second PHC 341.

The time 803 of the second PHC 341 is incremented with time.

First readout timing 802 represents timing at which the time synchronization processing unit 330 reads out time information about the first PHC 340. At rising timing of the first readout timing 802, time information about the first PHC 340 is communicated to the time synchronization processing unit 330 via the signal line 601. For example, in FIG. 8, it is illustrated that, at time t81, the time synchronization processing unit 330 has read out time information about the first PHC 340.

Second readout timing 804 represents timing at which the time synchronization processing unit 330 reads out time information about the second PHC 341. At rising timing of the second readout timing 804, time information about the second PHC 341 is communicated to the time synchronization processing unit 330 via the signal line 602. For example, in FIG. 8, it is illustrated that, at time t82, the time synchronization processing unit 330 has read out time information about the second PHC 341.

Correction timing 805 represents timing at which the time synchronization processing unit 330 communicates a time correction amount to the second PHC 341. At rising timing of the correction timing 805, the time correction amount is communicated from the time synchronization processing unit 330 to the second PHC 341 via the signal line 603. For example, in FIG. 8, at time t81, the time 801 of the first PHC 340 is "06", and, at time t82, the time 803 of the second PHC 341 is "03". The value "03" which is a time difference between the time 801 and the time 803 (="06"−"03") corresponds to the time correction amount. Then, at time t83, the time synchronization processing unit 330 issues, via the signal line 603, an adjustment instruction to the second PHC 341 to perform correction with the time correction amount (="03") (i.e., to gain time included in the time information). According to this instruction, the second PHC 341 updates the time information. In other words, at time t83, the time synchronization processing unit 330 adjusts the second PHC 341 in such a way as to overwrite time of the second PHC 341 with time of the first PHC 340. With this adjustment, the second PHC 341 enters into a state of being synchronized with the first PHC 340.

<Time Correction using Frequency Correction>

Figure 9:
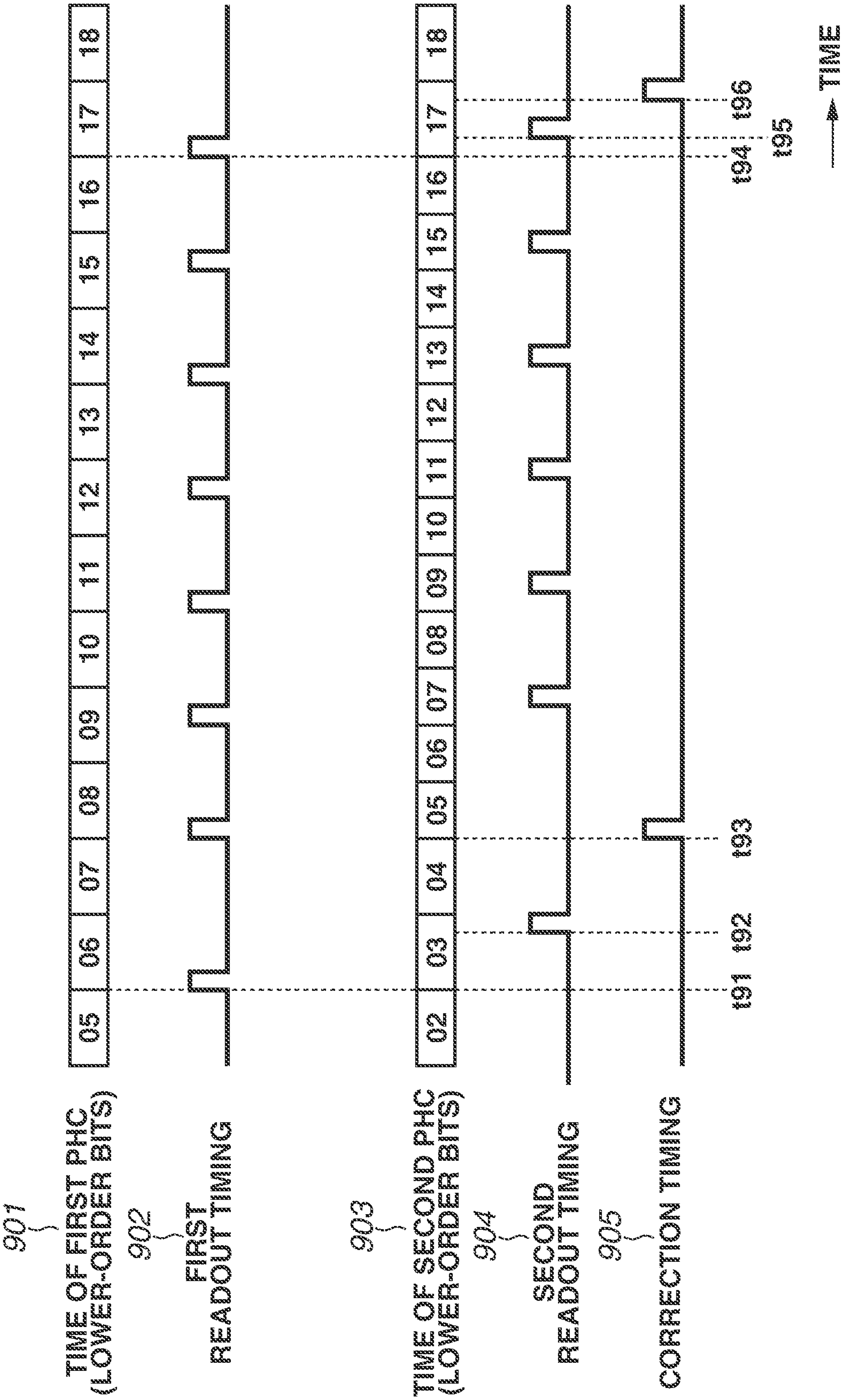
FIG. 9 is a diagram used to explain time correction using frequency correction according to the third embodiment.

FIG. 9 is a diagram used to explain time correction using frequency correction, and expresses, with passage of time, a procedure for correcting time of the second PHC 341 based on time of the first PHC 340. Time 901 of the first PHC 340 indicates lower-order bits of time information about the first PHC 340. The time 901 of the first PHC 340 is incremented with time. Similarly, time 903 of the second PHC 341 indicates lower-order bits of time information about the second PHC 341. The time 903 of the second PHC 341 is incremented with time.

First readout timing 902 represents timing at which the time synchronization processing unit 330 reads out time information about the first PHC 340. At rising timing of the first readout timing 902, time information about the first PHC 340 is communicated to the time synchronization processing unit 330 via the signal line 601. For example, in FIG. 9, it is illustrated that, at time t91, the time synchronization processing unit 330 has read out time information about the first PHC 340.

Second readout timing 904 represents timing at which the time synchronization processing unit 330 reads out time information about the second PHC 341. At rising timing of the second readout timing 904, time information about the second PHC 341 is communicated to the time synchronization processing unit 330 via the signal line 602. For example, in FIG. 9, it is illustrated that, at time t92, the time synchronization processing unit 330 has read out time information about the second PHC 341.

Correction timing 905 represents timing at which the time synchronization processing unit 330 communicates a time correction amount to the second PHC 341. At rising timing of the correction timing 905, the time correction amount is communicated from the time synchronization processing unit 330 to the second PHC 341 via the signal line 603. For example, in FIG. 9, at time t91, the time 901 of the first PHC 340 is "06", and, at time t92, the time 903 of the second PHC 341 is "03". This makes it understandable that the clock of the first PHC 340 runs faster than that of the second PHC 341 by the value "03" which is a time difference between the time 901 and the time 903 (="06"−"03"). Then, at time t93, the time synchronization processing unit 330 issues an adjustment instruction to the second PHC 341 to shorten the period of incrementing time information to make increment faster. In the example illustrated in FIG. 9, since the time of the second PHC 341 is faster in the gain of increment, at any timing, the lower-order bits of time information about the first PHC 340 and those of time information about the second PHC 341 become coincident with each other.

At the first readout timing 902 and the second readout timing 904, the time synchronization processing unit 330 reads out time information about the first PHC 340 and time information about the second PHC 341, respectively, and periodically checks a time difference between the two pieces of time information. In FIG. 9, time ("17") of the first PHC 340 at time t94 and time ("17") of the second PHC 341 at time t95 are coincident with each other. At timing at which the time synchronization processing unit 330 has detected (checked) this coincidence, i.e., at time t96, the time synchronization processing unit 330 issues an adjustment instruction to the second PHC 341 to restore the period of incrementing time information to make increment. With this adjustment, the second PHC 341 enters into a state of being synchronized with the first PHC 340.

Furthermore, while, in FIG. 9, it is illustrated that the first PHC 340 runs faster than the second PHC 341, there may be a case where, conversely, the first PHC 340 runs slower than the second PHC 341. In such a case, the time synchronization processing unit 330 issues an adjustment instruction to the second PHC 341 to lengthen the period of incrementing time information to make increment slow.

In this way, according to the third embodiment, in addition to the advantageous effects described above in the above-described embodiments, it becomes possible to perform adjustment in such a way as to accurately synchronize a clock used to execute the TC function with a clock used to execute the OC function.

According to the above-described embodiments, a communication apparatus independently includes a clock for the OC function and a clock for the TC function and is able to use the clock for the TC function irrespective of an operating state of the clock for the OC function. This enables the communication apparatus to, even in a case where correction has occurred in the clock for the OC function, accurately measure a staying time, in the communication apparatus, of a packet to be transferred. Furthermore, while, in the above-described embodiments, the PTP is used as a time synchronization protocol, the above-described embodiments can also be applied to another protocol. Moreover, the above-described embodiments can also be applied to another technique including measuring a staying time of a packet.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-186215 filed Nov. 22, 2022, which is hereby incorporated by reference herein in its entirety.

What is claimed is:

1. A communication apparatus including a first clock and a second clock which operate according to a predetermined time synchronization protocol, the communication apparatus comprising:

a time synchronization unit configured to synchronize time of the first clock with time of a time source device; and a measurement unit configured to measure a staying time, in the communication apparatus, of a packet to be transferred to a second communication apparatus or the time source device, based on time of the second clock, wherein the time synchronization unit synchronizes the time of the second clock with the time of the first clock during a period in which the staying time is not being measured by the measurement unit after synchronizing the time of the first clock with the time of the time source device.

2. The communication apparatus according to claim 1, wherein the time synchronization unit calculates a difference between time of the first clock and time of the time source device as a first difference and adjusts the first clock so that the first difference becomes "0", thus synchronizing time of the first clock with time of the time source device.

3. The communication apparatus according to claim 1, wherein the measurement unit acquires, from the second clock, first time at which the packet was received in the communication apparatus, acquires, from the second clock, second time at which the packet was transmitted from the communication apparatus, and measures a difference between the first time and the second time as the staying time, and wherein the time synchronization unit synchronizes time of the second clock with time of the first clock in a time period other than a time period in which the staying time is measured after the first time is acquired.

4. The communication apparatus according to claim 1, wherein the time synchronization unit calculates a difference between time of the second clock and time of the first clock as a second difference and adjusts the second clock so that the second difference becomes "0", thereby synchronizing time of the second clock with time of the first clock.

5. The communication apparatus according to claim 4, wherein the time synchronization unit overwrites time of the second clock with time of the first clock in such a manner that the second difference becomes "0", thereby synchronizing time of the second clock with time of the first clock.

6. The communication apparatus according to claim 4, wherein the time synchronization unit makes gain of time of the second clock slower or faster in such a manner that the second difference becomes "0", thus synchronizing time of the second clock with time of the first clock.

7. The communication apparatus according to claim 1, wherein the predetermined time synchronization protocol is Precision Time Protocol (PTP), and the packet is a packet compliant with the PTP.

8. A control method for a communication apparatus including a first clock and a second clock which operate according to a predetermined time synchronization protocol, the control method comprising:

synchronizing time of the first clock with time of a time source device; and measuring a staying time, in the communication apparatus, of a packet to be transferred to a second communication apparatus or the time source device, based on time of the second clock, wherein the synchronizing synchronizes the time of the second clock with the time of the first clock during a period in which the staying time is not being measured by the measuring after synchronizing the time of the first clock with the time of the time source device.

9. A non-transitory computer-readable storage medium storing computer-executable instructions that, when executed by a computer, cause the computer to perform a control method for a communication apparatus including a first clock and a second clock which operate according to a predetermined time synchronization protocol, the control method comprising:

synchronizing time of the first clock with time of a time source device; and measuring a staying time, in the communication apparatus, of a packet to be transferred to a second communication apparatus or the time source device, based on time of the second clock, wherein the synchronizing synchronizes the time of the second clock with the time of the first clock during a period in which the staying time is not being measured by the measuring after synchronizing the time of the first clock with the time of the time source device.

* * * * *